March 5, 1935.  W. E. JONES ET AL  1,993,606
SCALE ATTACHMENT
Filed May 6, 1933   2 Sheets-Sheet 2
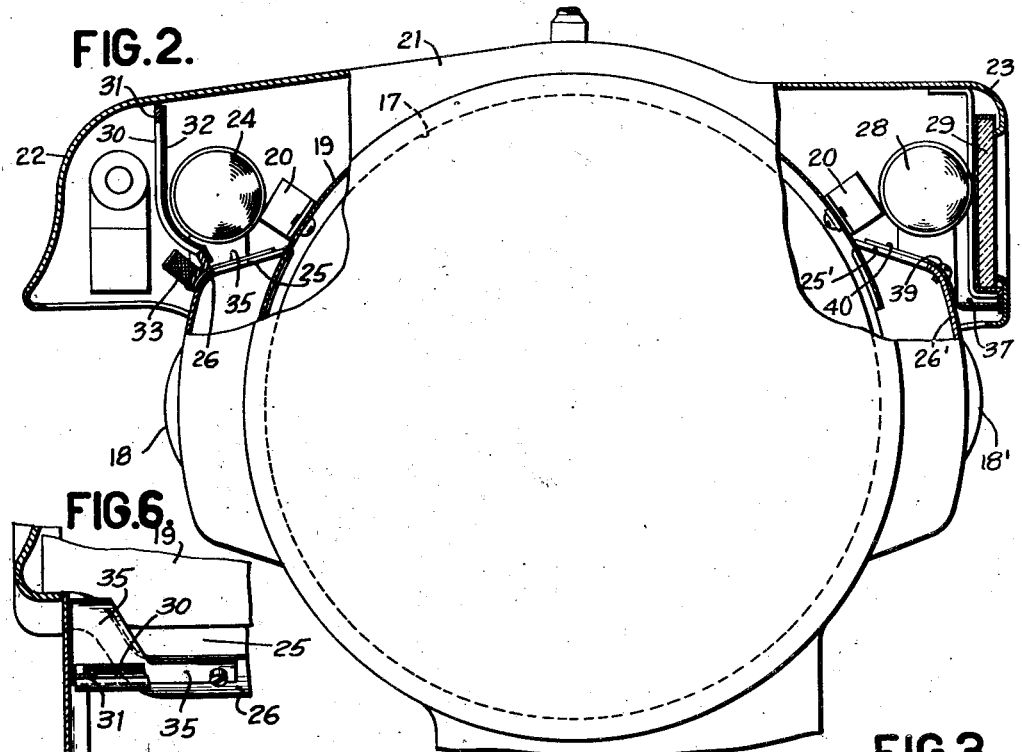
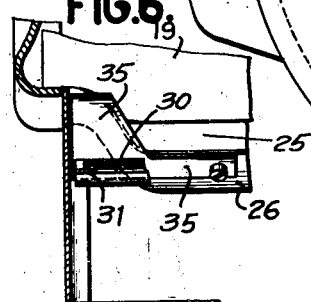
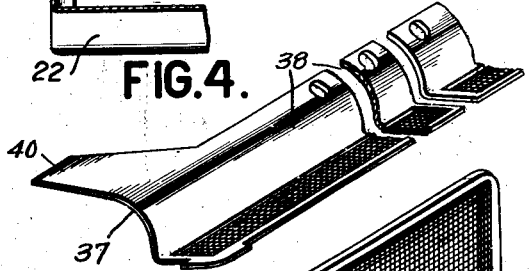
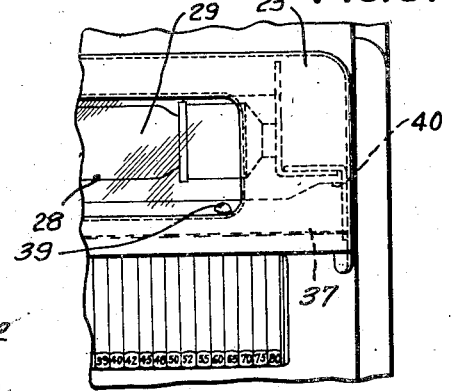
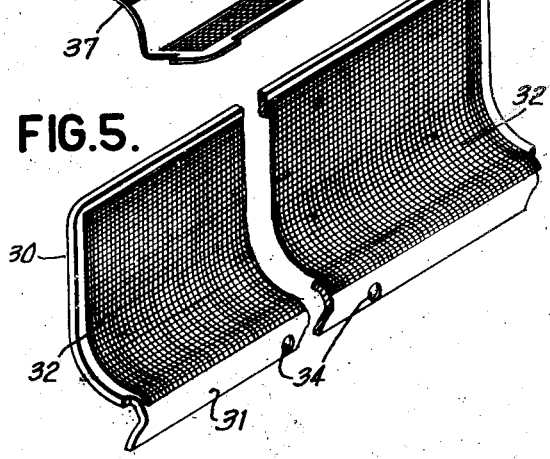

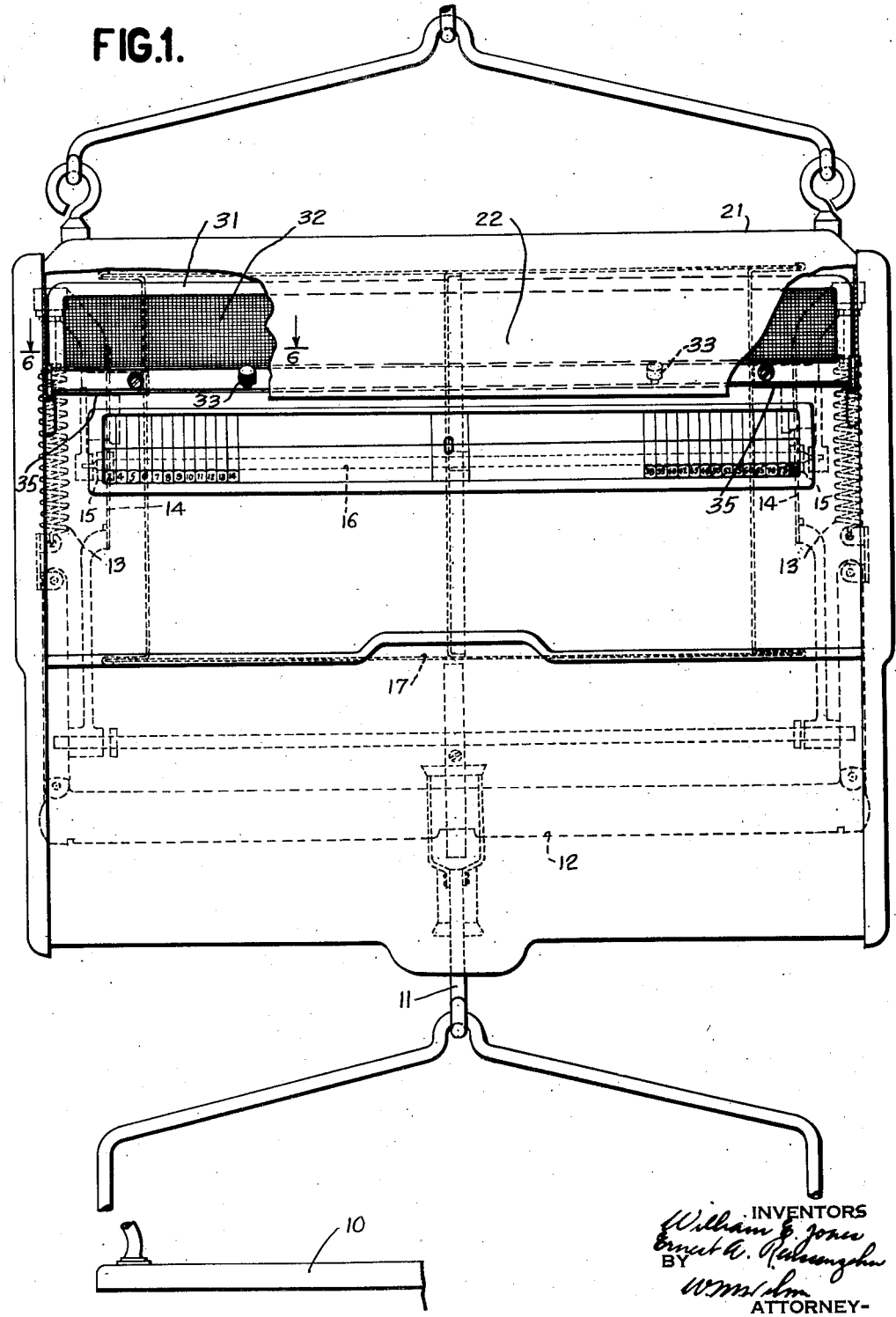

Patented Mar. 5, 1935

1,993,606

UNITED STATES PATENT OFFICE 1,993,606

SCALE ATTACHMENT

William E. Jones and Ernest Albert Reussenzehn, Dayton, Ohio, assignors, by mesne assignments, to The Hobart Manufacturing Company, Troy, Ohio, a corporation of Ohio Application May 6, 1933, Serial No. 669,628

6 Claims. (Cl. 240—2.11)

This case relates to weighing scales, particularly to a drum scale known as the Dayton Customeread scale. In this scale, the load actuates a rotary drum or cylinder chart having a plurality of circumferential price columns, each based on a different price per pound. To furnish the customer as well as the merchant with a price indication, duplicate columns of prices are arranged to be viewed by the customer at the opposite side of the scale from the merchant. For illuminating the chart, an illuminating head is provided such as disclosed in copending application Serial No. 630,624 owned by the assignee of the instant case. The housing of the chart has openings through which the light from the illuminating means is cast on the parts of the chart in reading position. Considerable trouble has been experienced from insects attracted by the light entering the interior of the scale where they may clog the pivots and bearings of the scale and destroy the delicate balance of the movable parts.

The object of the present invention is, accordingly, to provide readily attachable and removable guards to the illuminating means for preventing the entry of insects into the interior of the scale.

Further and other objects and advantages will be hereafter set forth in the accompanying specification and claims, and shown in the drawings, which by way of illustration show what is now considered to be the preferred embodiment of the invention.

In the drawings:

Fig. 1 is a front view of the merchant's side of the scale with part of the illuminating head broken away to show the interior;

Fig. 2 is an end view of the right side of Fig. 1 with the illuminating head partly sectioned to show the interior;

Fig. 3 is a detail front view of part of the customer's side of the scale;

Fig. 4 is a detail perspective view of an insect guard element at the customer's side of the scale;

Fig. 5 is a detail perspective view of the insect guard at the merchant's side of the scale; and Fig. 6 is a section on line 6—6 of Fig. 1.

The scale in which the invention has been embodied is fully disclosed in Patent #1,883,077. It comprises the load pan 10 hung from draft rod 11 connected to the horizontal draw bar 12 which operates the weighing springs 13 and racks 14. The racks actuate pinions 15 on the shaft 16 of the cylinder chart 17 which has duplicate sets of indications disposed on opposite halves of the scale to be viewed through merchant's and customer's respective magnifying lens 18 and 18'. To the drum casing 19 is fixed by brackets 20, the illuminating head 21 having a cowl 22 overhanging the merchant's lens 18 and a cowl 23 overhanging the customer's lens 18'. Lamps 24 are mounted in the cowl 22 in position to direct light against the inner walls of the cowl which reflect the light onto the load support. The article on the support is thus illuminated. Lamps 24 also direct light onto the chart through the opening 25 in the top of the pressed-out boss 26 of the head casing which mounts the magnifying lens 18. Cowl 23 carries lamps 28 which direct light on the customer's side of the chart through opening 25' in the boss 26' at the customer's side of the scale. Cowl 23 also carries the removable glass sign 29 illuminated by lamps 28.

On the merchant's side of the scale, an insect guard 30 consisting of a frame 31 with a wire mesh screen 32 fastened thereto is secured at the upper end of the lens mounting boss 26 by means of two thumb nuts 33, passing through vertically elongated holes 34 in the frame 31 to be threaded into the casing portion 26. The guard is located in front of lamps 24 and extends across the cowl 22 from end wall to end wall. The elongation of slots 34 is to permit adjustment of the screen vertically into close contact with the top of the cowl interior. As indicated in Fig. 6, the boss 26 at the ends bends away from the front of the cowl 22 forming a space extending horizontally inwardly beyond the part of the boss to which the guard 30 is secured. This end space is not covered by the guard 30 but by horizontally extending end plates 35 fastened at the ends of the boss. When it is desired to clean the guard 30 or to change the lamps 24, the thumb screws 33 may be turned to permit ready detachment of the guard. End guard plates 35 may remain in place when the guard 30 is removed.

On the customer's side of the scale, an insect guard 37 preferably made in two halves, each consisting of a frame 38 and a wire mesh screen attached to the frame is removably secured by screws 39 to the lens mounting boss 26'. The guard 37 has integral end portions 40 to cover the end spaces extending similarly to the end spaces on the merchant's side of the scale. The guard 37 extends horizontally across the space between boss 26' and the inner vertical wall of cowl 23 below the lamps 28 and sign 29 to prevent insects entering through opening 25' into the scale.

Guards 30 and 37 both prevent insects from reaching the lamps 24 and 28 and entering the scale through openings 25 and 25'. The wire screens permit the light from the lamps to pass through and therefore do not interfere with the illumination of the chart and load support by the lamps.

Openings 25 and 25' permit free circulation of air through the scale. Were these openings closed, the air inside the scale casing would become heated and tend to impair the weighing accuracy. Screens 30 and 37 do not interfere with the proper circulation of air through openings 25 and 25'.

The insect guards may be provided as removable attachments to a scale to be furnished whenever the user of the scale desires. All that is necessary to adapt the screens to a scale is to tap the threaded holes in the casing portions 26 and 26' for receiving screws 34 and 39. The scale as manufactured may have these holes already tapped to be made use of whenever the screen attachment is ordered.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed is:

1. A scale having a load controlled cylinder computing and weighing chart, a drum casing therefor having a sight window for the chart, an illuminating cowl fixed relative to the casing above the latter's sight window, illuminating means carried by the cowl, said casing having an opening through which light passes from the illuminating means to the chart portion behind said window, and a device secured to the casing and housed within the interior of said illuminating cowl to be concealed from view by the latter extending completely across the illuminating cowl in front of the illuminating means to prevent insects attracted by the light from entering the scale through said opening.

2. The invention according to claim 1, said device being removably carried by the casing separately and independently of the illuminating cowl to permit free access to the lamps when the device is removed.

3. A scale having a load controlled cylinder computing and weighing chart, a drum casing therefor having a sight window for the chart, an illuminating cowl fixed relative to the casing above the latter's sight window, illuminating means carried by the cowl, said casing having an opening through which light passes from the illuminating means to the chart portion behind said window, and a device secured to the casing to extend completely across the illuminating cowl in front of the illuminating means to prevent insects attracted by the light from entering the scale through said opening, said device being adjustably secured relative to the casing for adjustment in a vertical direction to permit the device to be adjusted into close contact with the upper wall of said cowl.

4. A scale having a load controlled cylinder computing and weighing chart, a drum casing therefor having a sight window for the chart, an illuminating cowl fixed relative to the casing above the latter's sight window, illuminating means carried by the cowl, said casing having an opening through which light passes from the illuminating means to the chart portion behind said window, and a device secured to the casing to extend completely across the illuminating cowl in front of the illuminating means to prevent insects attracted by the light from entering the scale through said opening, said device including end elements extending angularly to the front of the device to cover end spaces between the sides of the cowl and the sides of the sight window.

5. A scale having a load controlled cylinder chart, a drum casing therefor having a sight opening through which the chart is viewed, an illuminating head secured to the casing and having illuminating means for the chart, and a screen attachment attachable to and removable from the casing separately from the illuminating head for preventing insects or the like attracted by the illuminating means from entering the interior of the casing.

6. The invention according to claim 5, said casing having an expanded boss in which the sight opening is provided, said boss having at the top an opening through which light from the illuminating means passes to the chart, and said screen attachment being carried by said boss.

WILLIAM E. JONES.
ERNEST A. REUSSENZEHN.